United States Patent
De Pauw

(10) Patent No.: US 10,085,457 B2
(45) Date of Patent: Oct. 2, 2018

(54) SOURDOUGH COMPOSITIONS AND METHODS FOR THEIR PREPARATION

(75) Inventor: Paul De Pauw, Wasseiges (BE)

(73) Assignee: PURATOS NV (BE)

( * ) Notice: Subject to any disclaimer, the term of this patent is extended or adjusted under 35 U.S.C. 154(b) by 216 days.

(21) Appl. No.: 14/238,109

(22) PCT Filed: Aug. 10, 2012

(86) PCT No.: PCT/EP2012/065757
§ 371 (c)(1),
(2), (4) Date: Feb. 10, 2014

(87) PCT Pub. No.: WO2013/024056
PCT Pub. Date: Feb. 21, 2013

(65) Prior Publication Data
US 2014/0199435 A1  Jul. 17, 2014

(30) Foreign Application Priority Data

Aug. 12, 2011 (BE) .................................. 2011/0495

(51) Int. Cl.
*A21D 8/04* (2006.01)
*A21D 2/36* (2006.01)

(52) U.S. Cl.
CPC ............... *A21D 8/045* (2013.01); *A21D 2/36* (2013.01)

(58) Field of Classification Search
CPC ........ A21D 8/045; A21D 2/36; A23V 220/16; A23V 2250/21; A61K 36/82
See application file for complete search history.

(56) References Cited

U.S. PATENT DOCUMENTS

| | | | | |
|---|---|---|---|---|
| 1,388,019 A | * | 8/1921 | Breitholtz ................. | A21D 2/36 426/556 |
| 6,387,427 B1 | * | 5/2002 | Rekhif ..................... | A23B 7/10 426/335 |
| 6,465,027 B1 | * | 10/2002 | Taillade ................. | A21D 8/042 426/61 |

FOREIGN PATENT DOCUMENTS

| | | |
|---|---|---|
| DE | 4439979 A1 | 5/1996 |
| EP | 0903082 A1 | 3/1999 |
| GB | 2205476 * | 6/1987 |
| JP | S61-293332 A | 12/1986 |
| JP | H11-276072 A | 10/1999 |
| RU | 2081911 C1 | 6/1997 |

OTHER PUBLICATIONS

Boboye et al. Journal of Applied Sciences vol. 9 No. 4 2009 pp. 771-776 "Evaluation of Dough Sensory Properties Impacted by Yeasts Isolated from Cassava".*
Lochmuller Derwent Abstract of DE 4439979 May 15, 1996.*
Showa Sangyo JP 61-293332 Derwent Abstract.*
International Preliminary Report on Patentability for PCT/EP2012/065757 dated Feb. 18, 2014.
International Search Report for PCT/EP2012/065757 dated Feb. 21, 2014.
Riekstina-Dolge et al. (2012) "Aroma Composition and Polyphenol Content of Ciders Available in Latvian Market," International Journal of Biological, Biomolecular, Agricultural, Food and Biotechnological Engineering. 6(7):533-537.
Xu et al. (2005) "Effects of Inhibitory Environmental Factors on Growth of Oenococcus oeni CCSYU2068 for Malolactic Fermentation of Cider Production," Journal of the Institute of Brewing. 111(2):223-228.

* cited by examiner

*Primary Examiner* — Felicia C Turner
(74) *Attorney, Agent, or Firm* — Lathrop Gage LLP; James H. Velema, Esq.

(57) ABSTRACT

The present invention provides new flavors based on the fermentation of specific combinations of plants or plants extracts with specific combinations of microbial strains. More specifically sourdough products are provided with tea leaves or fractions thereof and fermented with the combination of strains of acetic acid bacteria and yeast in order to provide the new flavors.

23 Claims, No Drawings

SOURDOUGH COMPOSITIONS AND METHODS FOR THEIR PREPARATION

RELATED APPLICATIONS

This application is a 35 U.S.C. § 371 filing of International Application No. PCT/EP2012/065757, filed Aug. 10, 2012, which claims priority to Belgian Patent Application No. 2011/0495, filed on Aug. 12, 2011, each of which is incorporated herein by reference in its entirety.

FIELD OF THE INVENTION

The present invention provides new flavors based on the fermentation of specific combinations of plants or plants extracts with specific combinations of microbial strains. More specifically sourdough products are provided with tea leaves or fractions thereof and fermented with the combination of strains of acetic acid bacteria and yeast in order to provide the new flavors.

BACKGROUND OF THE INVENTION

Today, the modern consumer of bread products is looking constantly for high quality products. Besides freshness, shape and other characteristics, aroma and taste are of particular importance when making the choice for buying bread.

Sourdough fermentations and sourdough products addition to doughs are among other well known techniques to improve the aroma and the taste of breads. Typical tastes/aromas given by sourdough are lactic, acetic, toasted, fruity, fermented or cereal. Sourdoughs are generally obtained by the fermentation of cereals or cereal flours by strains of lactic acid bacteria and/or baker's yeast. Lactic acid bacteria isolated from sourdoughs are mainly *Lactobacillus, Leuconostoc, Pediococcus* and *Streptococcus*, but the majority belongs to the *Lactobacillus* group. Lactic acid bacteria fermentation generates lactic acid and/or acetic acid that give the acidity to the sourdough. *Saccharomyces cerevisiae* is the most frequent yeast species in conventional sourdough. Other species of *Saccharomyces, Candida, Pichia* and *Hansenula* have occasionally been isolated and used. It is generally considered that in sourdoughs, the ratio of lactic acid bacteria number to yeast number should be over 100 for optimal activity.

Three types of sourdoughs are generally recognized:

Traditional sourdoughs: sourdoughs that are restarted using a part of the previous fermented dough which is therefore constantly renewed in a cyclical way, using specific recipes and ripening conditions. The mother dough is then mixed with rest of the flour, water, salt and fat to a suitable consistency, and then given a short period for fermentation before final proving and baking.

Active sourdoughs: improved type of sourdoughs using adapted strains or liquid sourdough starters to start the fermentation. These sourdoughs can be pasty or liquid and are generally stable and easy to process for example in an automated bakery. There are enough living lactic acid bacteria and/or yeast to ferment a bread dough successfully or to initiate a multiple stage sourdough process.

Inactive powder or liquid sourdoughs: used by traditional or industrial bakeries for their convenience since the quality is constant and they are easy to use. They will deliver the acidity and the conventional sourdough flavor directly avoiding a long fermentation step.

In the prior art it is known to use other microbial strains than baker's yeast or lactic acid bacteria during bread dough fermentation. JP2001204376 describes the use of combinations of *Lactobacillus* and acetic acid bacteria such as *Acetobacter* and *Gluconobacter* together with yeast to prepare wheat flour doughs. Doughs made this way show improved properties and especially an increased volume of the dough, thereby obtaining high quality bread excellent in an outward appearance.

EP0903082 describes the use of mixtures of *Lactobacillus* and *Gluconobacter* strains (and eventually *Saccharomyces chevalieri*) to obtain a liquid ferment that reproduces the aroma of bagels. JP10201495 describes the use of a mixed culture of a cellulose producing bacterium (e.g. *Acetobacter xylinum* subsp. *sucrofermentans*) and another microorganism (a *Lactobacillus*, a yeast, etc.) to produce a cellulosic substance that can be used for strengthening food material doughs.

It is the aim of the present invention to provide breads with a constant quality, and with a new typical aroma and taste. Accordingly there is a need to have new stable ingredients as well as methods to obtain these ingredients.

SUMMARY OF THE INVENTION

The present invention provides a sourdough product comprising cereal or cereal fractions mixed with tea leaves, tea leaves fractions and/or tea leaves extracts, wherein said sourdough product is fermented by strains of acetic acid bacteria and yeast.

The present invention also relates to a method for obtaining a sourdough product comprising the steps of:
mixing cereal or cereal fractions and tea leaves, tea leaves fractions and/or tea leaves extracts with water;
fermenting the mixture with acid one or more acetic acid bacteria strains and one or more yeast strains, thereby obtaining a liquid sourdough product; and;
optionally drying said liquid sourdough product thereby obtaining a dried sourdough product.

The present invention also relates to the use of a sourdough product according to the invention as an ingredient in the preparation of food products (preferably baking applications).

The present invention also relates to the use of a sourdough product according to the present invention for stabilizing a liquid baker's yeast suspension The present invention also relates to a baked product comprising a sourdough product according to the invention.

These and further aspects and embodiments are described in the following sections and in the claims.

DETAILED DESCRIPTION OF THE INVENTION

Before the present method and devices used in the invention are described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may be used in the practice or testing of the present invention, the preferred methods and materials are now described.

In this specification and the appended claims, the singular forms "a", "an", and "the" include plural references unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The terms "comprising", "comprises" and "comprised of" also include the term "consisting of".

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all numbers and fractions subsumed within the respective ranges, as well as the recited endpoints.

The present invention relates to sourdough products provided with or providing new flavors based on the fermentation of specific combinations of plants or plants extracts with specific combinations of microbial strains. More specifically sourdough products are provided with tea leaves, tea leaves fractions thereof and/or tea leaves extracts and fermented with a combination of strains of acetic acid bacteria and yeast in order to provide the new flavors.

The sourdough products according to the present invention are characterized by their unusual composition in acids. Indeed, the inventors have found that besides the "common" acetic acid and/or lactic acid the fermented dough contains also gluconic acid as major chemical compound. The sourdough product further contains a diverse range of alcohols, aldehydes, ketones, esters and amino acids, such as but not limited to ethyl acetate, ethanol, isoamyl acetate, 2-methyl-1-butanol, nonanal, acetic acid, linalole, trans-2-decenal, alpha-terpineol, ethyl phenylacetate, 2-phenetyl acetate, phenylethyl alcohol, vitispirane, g-nonalactone and hexanal. Surprisingly, the inventors have found that the aroma of the sourdough products according to the present invention is completely different from the aroma of "classical" sourdough products. For example the characteristic lactic note of conventional sourdoughs is absent or dominated by an aroma close to apple, apple cider or sparkling wine.

The present invention therefore provides in sourdough products comprising cereal or cereal fractions mixed with tea leaves, tea leaves fractions and/or tea leaves extracts, wherein said sourdough product is fermented by strains of acetic acid bacteria and yeast.

As used in the present application, the term "cereal", in the context of the present invention, refers to the edible components of plants of the botanical family of the Poaceae, including but not limited to species such as wheat, barley, oat, spelt, rye, sorghum, maize, triticale, millet, teff and/or rice. Preferably, the cereals are chosen among the group of wheat, maize (corn), rice or rye. More preferred cereals are rye, rice and wheat. An even more preferred cereal is rye.

The term "cereal fraction", in the context of the present invention, refers to all or part of the fractions resulting from mechanical reduction of the size of grains, through, as examples but not limited to, cutting, rolling, crushing, breakage or milling, with or without fractionation, through, as examples but not limited to, sieving, screening, sifting, blowing, aspirating, centrifugal sifting, wind sifting, electrostatic separation, or electric field separation. Preferred cereal fractions are flours, whole flours, brans and/or any combination thereof.

The terms "tea leaves", "tea leaves fraction" or "tea leaves extract" as used herein, refer to the products issued from the processing of the leaves, leaf buds, and internodes of various cultivars and sub-varieties of the *Camellia sinensis* plant, and preferably obtained from black or green tea.

The inventors have surprisingly found that the sourdough product according to the present invention is particularly stable and more specifically does not require stabilizers, such as gums like xanthan gum, to prevent decantation.

Also, the product according to the present invention is particularly microbiologically stable. It does not require low temperature storage for at least 9 weeks.

According to a particular embodiment, the present invention provides in sourdough products wherein said one or more strains of acetic acid bacteria are Acetobacteraceae, preferably from the genus *Acetobacter, Gluconobacter* and/or *Gluconoacetobacter* and wherein said yeast strains are chosen from *Zygosaccharomyces* or *Schizosaccharomyces, Torulopsis, Brettanomyces, Candida* and/or *Rhodotorulla*.

Accordingly, the present invention provides in a sourdough product comprising cereal or cereal fractions mixed with tea leaves, tea leaves fractions and/or tea leaves extracts, wherein said sourdough product is fermented by strains of acetic acid bacteria and yeast, wherein said one or more strains of acetic acid bacteria are Acetobacteraceae, preferably chosen from the genus *Acetobacter, Gluconobacter* and/or *Gluconoacetobacter*, and wherein said one or more yeast strains are chosen from *Zygosaccharomyces* or *Schizosaccharomyces, Torulopsis, Brettanomyces, Candida* and/or *Rhodotorulla*.

More particularly, the present invention provides in sourdough products wherein said one or more strains of acetic acid bacteria are chosen from the genus *Acetobacter* and/or *Gluconoacetaobacter* and wherein said one or more strains yeast are chosen from *Zygosacharomyces* and/or *Brettanomyces*.

More particularly, the present invention provides in sourdough products wherein said one or more strains of acetic acid bacteria are from the species *Gluconoacetobacter hansenii, Gluconoacetobacter rhaeticus* or *Acetobacter pasteurianus* and wherein said yeast strains are chosen from the species *Zygosaccharomyces bailii, Zygosaccharomyces lentus* or *Brettanomyces anomalus*.

The bacteria used in the present invention are preferably selected from the group of acetic acid bacteria. One or more of said acetic acid bacteria may be used. Any combination is envisaged. More specifically they belong to the Acetobacteraceae, preferably from the genus *Acetobacter, Gluconobacter* or *Gluconoacetobacter*. Specific species are *Acetobacter* spp., such as *Acetobacter aceti, Acetobacter pasteurianus, Acetobacter xylinum*, especially *Acetobacter xylinum* cellulose-producing strains or *Acetobacter pasteurianus* and more particularly *Acetobacter pasteurianus, Gluconobacter* spp., and/or *Gluconoacetobacter* spp. such as *Gluconoacetobacter hansenii* or *Gluconoacetobacter rhaeticus*. More preferred species are *Gluconoacetobacter hansenii, Gluconoacetobacter rhaeticus* or *Acetobacter pasteurianus*. Even more preferred bacterial strains are

*Gluconoacetobacter hansenii* MO-621, *Gluconoacetobacter rhaeticus* MO-622 or *Acetobacter pasterianus* MO-0001240.

The one or more yeast strains used in the present invention are preferably non-conventional yeast species strains (i.e. not commonly used for preparing sourdough). One or more of said yeast strains may be used and any combination is envisaged. Preferred genuses are *Zygosaccharomyces* or *Schizosaccharomyces, Torulopsis, Brettanomyces, Candida* or *Rhodotorulla*. Preferred species are *Zygosaccharomyces bailii, Zygosaccharomyces lentus, Zygosaccharomyces rouxii, Schizosaccharomyces pombe, Torulopsis delbreuckii, Brettanomyces bruxellensis, Brettanomyces intermedius*, or *Brettanomyces anomalus, Candida stellata, Candida famata* or *Rhodotorulla mucilaginosa*. More preferred species are *Zygosaccharomyces bailii, Zygosaccharomyces lentus* or *Brettanomyces anomalus*. Even more preferred strains are *Zygosaccharomyces bailii* MO-619, *Zygosaccharomyces lentus* MO-620 or *Brettanomyces anomalus* MO-0000988.

More particularly, the present invention provides in sourdough products wherein said one or more strains of acetic acid bacteria are *Gluconoacetobacter hansenii* MO-621 or *Gluconoacetobacter rhaeticus* MO-622 as deposited on Feb. 25, 2011 in the BCCM/LMG (Laboratorium voor Microbiologie—Bactërienverzameling; Universiteit Gent; K. L. Ledeganckstraat 35; B-9000 Gent, Belgium) under the accession numbers LMG P-26321 (see table A1) and LMG P-26320 (see table A2) respectively, or *Acetobacter pasterianus* MO-0001240 as deposited on Jul. 24, 2012 in the BCCM/LMG under the accession number LMG P-27108 (see table A3) and wherein said one or more yeast strains are *Zygosaccharomyces bailii* MO-619 or *Zygosaccharomyces lentus* MO-620 as deposited on Feb. 25, 2011 in the BCCM/MUCL (Mycothèque de l'Université Catholique de Louvain; Université Catholique de Louvain; Place Croix du Sud, 3; B-1348 Louvain-la-Neuve, Belgium) under the accession numbers MUCL 53405 (see table A4) and MUCL 53406 (see table A5) respectively or *Brettanomyces anomalus* MO-0000988 as deposited on Jul. 25, 2012 in the BCCM/MUCL under the accession number MUCL 54381 (see table A6).

TABLE A1

Indications relating to deposited microorganism LMG P-26321

| | |
|---|---|
| Accession number given by depositary institution | LMG P-26321 |
| Identification reference given by the depositor | MO-621 |
| Name of depositary institution | Belgian Coordinated Collections of Microorganisms (BCCM)/Laboratorium voor Microbiologie—Bactërienverzameling (LMG) |
| Address of depositary institution | Universiteit Gent K.L. Ledeganckstraat 35 B-9000 Gent Belgium |
| Date of deposit | Feb. 25, 2011 |
| Name of depositor | PURATOS NV |
| Address of depositor | Industrialaan 25 B-1702 Groot-Bijgaarden Belgium |

TABLE A2

Indications relating to deposited microorganism LMG P-26320

| | |
|---|---|
| Accession number given by depositary institution | LMG P-26320 |

TABLE A2-continued

Indications relating to deposited microorganism LMG P-26320

| | |
|---|---|
| Identification reference given by the depositor | MO-622 |
| Name of depositary institution | Belgian Coordinated Collections of Microorganisms (BCCM)/Laboratorium voor Microbiologie—Bacteriënverzameling (LMG) |
| Address of depositary institution | Universiteit Gent K.L. Ledeganckstraat 35 B-9000 Gent Belgium |
| Date of deposit | Feb. 25, 2011 |
| Name of depositor | PURATOS NV |
| Address of depositor | Industrialaan 25 B-1702 Groot-Bijgaarden Belgium |

TABLE A3

Indications relating to deposited microorganism LMG P-27108

| | |
|---|---|
| Accession number given by depositary institution | LMG P-27108 |
| Identification reference given by the depositor | MO-0001240 |
| Name of depositary institution | Belgian Coordinated Collections of Microorganisms (BCCM)/Laboratorium voor Microbiologie—Bacteriënverzameling (LMG) |
| Address of depositary institution | Universiteit Gent K.L. Ledeganckstraat 35 B-9000 Gent Belgium |
| Date of deposit | Jul. 24, 2012 |
| Name of depositor | PURATOS NV |
| Address of depositor | Industrialaan 25 B-1702 Groot-Bijgaarden Belgium |

TABLE A4

Indications relating to deposited microorganism MUCL 53405

| | |
|---|---|
| Accession number given by depositary institution | MUCL 53405 |
| Identification reference given by the depositor | MO-619 |
| Name of depositary institution | Belgian Coordinated Collections of Microorganisms (BCCM)/Mycothèque de l'Université catholique de Louvain (MUCL) |
| Address of depositary institution | Université catholique de Louvain Croix du Sud, 3—bte 6 B-1348 Louvain-la-Neuve Belgium |
| Date of deposit | Feb. 25, 2011 |
| Name of depositor | PURATOS NV |
| Address of depositor | Industrialaan 25 B-1702 Groot-Bijgaarden Belgium |

TABLE A5

Indications relating to deposited microorganism MUCL 53406

| | |
|---|---|
| Accession number given by depositary institution | MUCL 53405 |
| Identification reference given by the depositor | MO-620 |
| Name of depositary institution | Belgian Coordinated Collections of Microorganisms (BCCM)/Mycothèque de l'Université catholique de Louvain (MUCL) |

TABLE A5-continued

Indications relating to deposited microorganism MUCL 53406

| | |
|---|---|
| Address of depositary institution | Université catholique de Louvain Croix du Sud, 3—bte 6 B-1348 Louvain-la-Neuve Belgium |
| Date of deposit | Feb. 25, 2011 |
| Name of depositor | PURATOS NV |
| Address of depositor | Industrialaan 25 B-1702 Groot-Bijgaarden Belgium |

TABLE A6

Indications relating to deposited microorganism MUCL 54381

| | |
|---|---|
| Accession number given by depositary institution | MUCL 54381 |
| Identification reference given by the depositor | MO-0000988 |
| Name of depositary institution | Belgian Coordinated Collections of Microorganisms (BCCM)/Mycothèque de l'Université catholique de Louvain (MUCL) |
| Address of depositary institution | Université catholique de Louvain Croix du Sud, 3—bte 6 B-1348 Louvain-la-Neuve Belgium |
| Date of deposit | Jul. 25, 2012 |
| Name of depositor | PURATOS NV |
| Address of depositor | Industrialaan 25 B-1702 Groot-Bijgaarden Belgium |

According to a particular embodiment, the present invention provides in sourdough products wherein said sourdough product is fermented by additional microorganisms chosen from lactic acid forming bacteria such as *Leuconostoc* or *Lactobacillus* and/or yeast strains chosen from *Saccharomyces*.

It is another aspect of the present invention to combine the microorganisms used to obtain the sourdough according to the invention with conventional microorganisms (i.e. microorganisms that are used for preparing regular (traditional) sourdoughs). Such additional microorganisms may be preferentially chosen among lactic acid bacteria and/or yeast. Preferably lactic acid bacteria are chosen among lactic acid forming bacteria such as *Leuconostoc* or *Lactobacillus*, preferably selected from the group of *Lactobacillus plantarum, Lactobacillus brevis, Lactobacillus sanfrancisciensis* or *Lactobacillus reuterii*. Yeast strains are advantageously chosen among *Saccharomyces cerevisiae* or *Saccharomyces exiguus*. In a preferred embodiment the amount of yeast comprised in the product/sourdough is the amount needed for the leavening of a bread dough.

According to a particular embodiment, the present invention provides in sourdough products wherein said sourdough product is a liquid sourdough product or a dried sourdough product.

Sourdough products may come in many forms. A liquid sourdough product is probably the most commonly used type. However, also other types of sourdough products are available, including dried or dry sourdough products. Sourdough products under a dry form are typically obtained by drying a liquid sourdough composition. Preferably, the dry matter of the solid/powdered composition is more than 85% (w/w), preferably more than 90%, and more preferably 92% or more. Said range thus also provides 86, 87, 88, 89, 91, 93, 94, 95, 96, 97, 98, 99 or 100% dry matter.

According to a particular embodiment, the present invention provides in liquid sourdough products wherein said liquid sourdough product is characterized by having a dry matter between 10% (w/w) and 45%, preferably between 15% and 40%, more preferably between 20% and 35%. Said range thus also provides any of 16, 17, 18, 19, 21, 22, 23, 24, 25, 26, 27, 28, 29, 30, 31, 32, 33, 34, 35, 36, 37, 38, 39, 41, 42, 43 or 44% dry matter.

The liquid sourdough product according to the present invention can be characterized by its Total Titratable Acidity (TTA). According to the present invention the TTA refers to the amount (expressed in ml) of 0.1N NaOH needed to bring the pH of 10 g of the product to 8.5. The Total Titratable Acidity is a product property commonly known to the person skilled in the art. The Total Titratable Acidity may also be of at least 10, preferably between 10 and 300, and more preferably between 15 and 250. Said range thus also provides 15, 20, 25, 50, 100, 150 or 200 Total Titratable Acidity.

More particularly, the present invention provides in liquid sourdough products wherein said liquid sourdough product is an active or an inactive liquid sourdough product. Alternatively the invention provides in dried sourdough products which may be active or inactive dried sourdough products.

Preferably, the liquid sourdough product according to the present invention is an active liquid sourdough product. By this is meant that the sourdough product contains active and/or viable microorganisms. An active liquid sourdough product can be used as a starter to produce pasty or other liquid sourdough products having the same specifications and properties as described above. Like conventional active sourdoughs the active liquid sourdough product guarantees a homogeneity in quality and in processing. The active liquid sourdough products will also accelerate the process of sourdough development towards acid/acidity generation and sourdough stabilization and innovative flavor. As such they enhance importantly the convenience for all users.

In another preferred embodiment of the present invention the liquid sourdough is inactive. By this is meant that the sourdough product no longer contains active and/or viable microorganisms. For this the liquid sourdough product is inactivated through (continuous) pasteurization, for example at a temperature of about 55 to about 90° C. for about 10 sec to about 60 minutes.

Furthermore, according to a particular embodiment, the present invention relates to a dried sourdough product obtained by drying a liquid sourdough product according to the present invention.

The drying of the liquid sourdough product can be performed using the typical drying techniques available to the skilled person. Preferably the dried sourdough product is obtained through fluidization, spray-drying or by drum-drying of the liquid sourdough product. Preferably, the dry matter of the solid/powdered composition is more than 85%, preferably more than 90%, more preferably 92% or more. This range includes the dry matter values of 86, 87, 88, 89, 91, 93, 94, 95, 96, 97, 98, 99 and 100%.

It is also an object of the present invention to provide methods to obtain the sourdough products as described above.

Therefore, the present invention further relates to methods for obtaining a sourdough product comprising the steps of:
  mixing cereal or cereal fractions and tea leaves, tea leaves fractions and/or tea leaves extracts with water;
  fermenting the mixture with one or more acid acetic acid bacteria strains and one or more yeast strains, preferably as defined above, at a temperature between 15° C.

and 50° C. for period between 24 hours and 1000 hours, thereby obtaining a liquid sourdough product; and;

optionally drying said liquid sourdough product thereby obtaining a dried sourdough product.

The bacteria strains used in the method of the present invention are preferably selected from the group of acetic acid bacteria. More specifically they belong to the Acetobacteraceae, preferably from the genus *Acetobacter, Gluconobacter* or *Gluconoacetobacter*. Specific species are *Acetobacter* spp., such as *Acetobacter aceti, Acetobacter pasteurianus, Acetobacter xylinum*, especially *Acetobacter xylinum* cellulose-producing strains or *Acetobacter pasteurianus* and more particularly *Acetobacter pasteurianus, Gluconobacter* spp., and/or *Gluconoacetobacter* spp. such as *Gluconoacetobacter hansenii* or *Gluconoacetobacter rhaeticus*. More preferred species are *Gluconoacetobacter hansenii, Gluconoacetobacter rhaeticus* or *Acetobacter pasteurianus*. Even more preferred bacterial strains are *Gluconoacetobacter hansenii* MO-621, *Gluconoacetobacter rhaeticus* MO-622 or *Acetobacter pasterianus* MO-0001240. We refer also to the deposits as described above.

The yeast strains used in the method of the present invention are preferably non-conventional yeast species (i.e. not commonly used for preparing sourdough). Preferred genuses are *Zygosaccharomyces* or *Schizosaccharomyces, Torulopsis, Brettanomyces, Candida* or *Rhodotorulla*. Preferred species are *Zygosaccharomyces bailii, Zygosaccharomyces lentus, Zygosaccharomyces rouxii, Schizosaccharomyces pombe, Torulopsis delbreuckii, Brettanomyces bruxellensis, Brettanomyces intermedius, Brettanomyces anomalus, Candida stellata, Candida famata* or *Rhodotorulla mucilaginosa*. More preferred species are *Zygosaccharomyces bailii, Zygosaccharomyces lentus* or *Brettanomyces anomalus*. Even more preferred strains are *Zygosaccharomyces bailii* MO-619, *Zygosaccharomyces lentus* MO-620 or *Brettanomyces anomalus* MO-0000988. We refer also to the deposits as described above.

According to the present invention the cereal or cereal fractions and the tea leaves, tea leaves fractions and/or tea leaves extracts are firstly suspended in a suitable liquid, preferably water. Dry matter of this (liquid) mixture is preferably between 15% and 45% as described above. The (liquid) mixture is fermented by the addition of living cells comprising, or consisting of, acetic acid bacteria and yeast and incubation for a period between 24 and 1000 hours, preferably between 48 and 240 hours, more preferably between 48 and 168 hours and at a temperature between 15° C. and 50° C., preferably between 25° C. and 45° C. This range includes periods of 58, 68, 78, 100, 125, 150, 175, 200 and 220 hours. This range includes temperatures of 30, 35 and 40° C.

In a preferred embodiment the living cells are added under the form of cells having been first cultivated in another culture medium. Preferably the acid acetic acid bacteria and the yeasts are separately (pre)cultivated.

In another embodiment a two-step fermentation system can be used. The acid acetic acid bacteria and the yeast are pre-fermented together in a first step with all ingredients but without the cereal fraction and used as an active starter for a second fermentation step after addition of the cereal fraction.

Preferably, during incubation, the mixture is mixed regularly or at various intervals.

According to the present invention, the Total Titratable Acidity at the end of the fermentation is preferably between 10 and 300, more preferably between 15 and 250 as defined above.

Still according to the present invention the pH at the end of the fermentation is comprised between 6.5 and 3, preferably between 4.5 and 3.5. Said range includes pH's of 5.5, 5 and 4.

Still according to the present invention the dry matter at the end of the fermentation is comprised between 10% and 45%, preferably between 15% and 40%, more preferably between 20% and 35%, as defined above.

Dry/solid form such as powder may be obtained by subjecting the liquid composition to a drying step such a fluidization, spray drying or drum drying. Preferred dry matter of the solid/powdered composition is more than 85%, preferably more than 90%, more preferably more than 92% as defined above.

More particularly, the present invention provides in a method further comprising one or more steps chosen from the group of:

adding other microorganisms and/or additional ingredients to the mixture prior to or after the step of fermenting said mixture;

adding stabilizers after the fermentation step;

inactivating said sourdough; and, packing said sourdough in containers.

Additional ingredients may be chosen among salts, vitamins, sugars such as sucrose, proteins sources such as protein hydrolyzates or yeast extracts.

At the end of the fermentation, the composition may be inactivated by a heating step. This may be done using the common methods in the art known to the skilled person, and preferably using a (continuous) pasteurization process for inactivation, for example at a temperature of about 55 to about 90° C. for about 10 seconds to about 60 minutes as defined above.

According to another embodiment, the present invention provides in the use of a sourdough product according to the present invention as an ingredient in the preparation of food products, and preferably in the preparation of bakery products. Examples of the use of a sourdough product in the preparation of food products is the preparation of a sourdough for a baked product and the preparation of sourdough for further use in preparing doughs or baked products (such as breads).

More particularly, the present invention provides in the use of a sourdough product according to the present invention as part of an improver, a premix or a complete mix in the preparation of baked products.

An "improver" as used herein refers to a composition of the invention further comprising ingredients and/or technological aids used for their beneficial properties during the preparation of baked products and/or after baking. These properties comprise but are not limited to aspect, volume, freshness, conservation, color, structure or short bite of the baked products.

The term "premix" as used herein refers typically to an improver composition wherein the concentration in "active" component is lower than in a bakery improver. Typically a premix is used at a higher dose than an improver (weight/weight of flour).

The term "complete mix" as used herein refers typically to a composition comprising all the ingredients needed to prepare a dough that can be baked to obtain a baked product, generally with the exception of water. In particular when the leavening agent is a biological agent, more particularly baking yeast, it can also be excluded from the complete mix. A complete mix according to the present invention comprises the sourdough composition according to the invention and all the ingredients needed to prepare a dough that can be baked to obtain a baked product.

More particularly, the present invention provides in the use of a sourdough product according to the present invention for stabilizing a liquid baker's yeast suspension According to another embodiment, the present invention provides in baked products comprising a sourdough product according to the present invention.

A baked product according to the present invention comprises an unleavened, a yeast-leavened or a chemically leavened baked product, the major ingredient of which is flour derived from cereal grains. The baked product of the invention may also contain fat or fat replacer, sugar, eggs, gluten, starch, hydrocolloids, enzymes, emulsifiers, oxidizing or reducing compounds, prebiotics compounds and/or an improver. Examples of baked products are bakery products and patisserie products.

The invention will be described in the following non-limiting examples.

EXAMPLES

Example 1: Strains

Strains were isolated from Kombucha samples obtained from Belgian groceries. They were identified by conventional morphological, physical and molecular methods.

The strains *Gluconoacetobacter hansenii* MO-621 or *Gluconoacetobacter rhaeticus* MO-622 have been deposited on Feb. 25, 2011 in the BCCM/LMG (Laboratorium voor Microbiologie—Bacteriënverzameling; Universiteit Gent; K. L. Ledeganckstraat 35; B-9000 Gent, Belgium) under the accession numbers LMG P-26321 and LMG p-26320 respectively. The strains *Zygosaccharomyces bailii* MO-619 and *Zygosaccharomyces lentus* MO-620 have been deposited on Feb. 25, 2011 in the BCCM/MUCL (Mycothèque de l'Université Catholique de Louvain; Université Catholique de Louvain; Place Croix du Sud, 3; B-1348 Louvain-la-Neuve, Belgium) under the accession numbers MUCL 53405 and MUCL 53406 respectively.

The strain *Acetobacter pasteurianus* MO-0001240 has been deposited on Jul. 24, 2012 in the BCCM/LMG (cf above) under the accession number LMG P-27108. The strain *Brettanomyces anomalus* MO-0000988 has been deposited on Jul. 25, 2012 in the BCCM/MUCL (cf above) under the accession number MUCL 54381.

Example 2: Tea Extract 125 g of grinded dried tea leaves were mixed with 500 g sucrose in 5 L distilled water. After boiling the mixture for 15 minutes the leaves were separated by filtration or centrifugation and the liquid was cooled to 25° C.

Example 3: Sourdough 800 g of black tea extract of example 2 were mixed with 400 g of rye flour (R1700, Plange Mühle) and 1 ml of a mineral and vitamins solution (table 1) in a conventional dough mixer (Diosna SP24) at room temperature. The dough was inoculated with cultures MO-620 (*Zygosaccharomyces lentus*) and MO-621 (*Gluconoacetobacter hansenii*) at $10^6$ and $10^7$ cfu/g dough respectively. The liquid dough was incubated at 30° C. during 7 days. Half of it was gently mixed throughout the incubation while the second half was kept static without mixing.

TABLE 1

| minerals and vitamins solution | |
|---|---|
| | g/litre |
| B6 Pyridioxine HCl | 0.4 |
| Riboflavine | 0.03 |
| $ZnSO_4.7H_2O$ | 9.7 |
| $CuSO_4.5H_2O$ | 2.13 |
| $MnCl_2.2H_2O$ | 12.86 |
| $CoCl_2.6H_2O$ | 0.98 |
| Ammonium molybdate | 1.22 |
| $H_3BO_3$ | 0.08 |
| $Al_2(SO_4)_3.18H_2O$ | 13.42 | pH and acidity were measured during fermentation. Results are presented on table 2.

TABLE 2

| | Static sourdough (SD1) | | Mixed sourdough (SD2) | |
|---|---|---|---|---|
| # days | pH | acidity | pH | acidity |
| 0 | 6.4 | 1.6 | 6.8 | 1.6 |
| 3 | 3.7 | 27.7 | 3.7 | 20.7 |
| 7 | 3.6 | 45.9 | 3.7 | 27.3 |

Both sourdoughs had an pleasant aroma described as being close to the aroma of a sweet sparkling apple cider, the aroma of sourdough SD2 being more pronounced than the aroma of SD1.

Example 4: Breads

The liquid sourdoughs of example 3 were used to prepare pan wheat breads. The composition of the bread dough is shown in Table 3.

TABLE 3

| Ingredient | Quantity |
|---|---|
| Wheat flour (DUO—Ceres, Belgium) | 1500 g |
| Water | 855 g |
| Fresh yeast | 45 g |
| Sourdough of example 3 (SD1 or SD2) | 150 g |
| Salt | 30 g |
| S-500 Controller (Puratos, Belgium)* | 2% |

*S-500 controller is a regular bread improver that contains as main ingredients enzymes (alpha-amylase, xylanase), ascorbic acid and emulsifiers.

The ingredients (table 2) were mixed for 1.5 min at low speed and 6 min at high speed in a dough mixer (Diosna SP24). Temperature in the bakery was about 25° C. Dough temperature was about 26° C. After a bulk fermentation for 30 min the dough was divided in 600 g pieces and submitted to an intermediate proofing step of 20 min at 25° C.

A final proofing step of the individuals doughs placed in molds was performed in a Koma fermentation room (60 min, 35° C., 95% relative humidity) before baking at 230° C. for 35 min with steam in a Miwe Roll Inn oven.

The breads were evaluated the day after baking by an expert panel of about 8 persons trained to identify and describe aromas and tastes. The flavors of the breads made with either static or mixed sourdough were defined by the experts as "weak sweet sparkling apple cider" and "sweet sparkling apple cider" respectively.

Example 5: Starter 1000 ml of tea extract of example 2 was complemented with 0.3% of yeast extract and 0.75 ml of a minor component solution containing B6 Pyridioxine HCl (vit B6), riboflavin, $ZnSO_4.7H_2O$, $CuSO_4.5H_2O$, $MnCl_2.2H_2O$, $CoCl.6H_2O$, $(NH_4)_2.MoO_4$, $H_3BO_3$ and $Al_2(SO_4)_3.18H_2O$. Afterwards the medium was inoculated with a mixed culture of 10exp7 cells of strain MO-621/ml (*Gluconoacetobacter hansenii*) and 10exp6 cells of strain MO-620/ml (*Zygosaccharomyces lentus*). The pH adjusted at 6.

The fermentation was performed in a 2 L Biostat B fermentor (B.BRAUN) regulated at a temperature of 30° C., a rate of aeration of 1 VVM and an agitation of 600 rpm for 2 days.

After fermentation the starter was kept refrigerated at 4° C. till max. 4 weeks.

Example 6: Use of the Starter to Prepare a Sourdough Based on Rye Flour 240 g of the starter of example 5 were mixed with 150 g of a conventional rye flour (R1700, Plange Mühle) and incubated during 2 days at room temperature with gentle mixing. The fermented sourdough (SD3) was kept for 3 weeks either at room temperature or at 4° C. Table 4 shows the pH, the acidity, and the physical and microbial stabilities of both samples.

TABLE 4

| | pH | Acidity | Stability | Microbial stability |
|---|---|---|---|---|
| Sourdough after 3 weeks at 4° C. | 3.72 | 18.181 | No decantation | No contamination |
| Sourdough after 3 weeks at RT | 3.75 | 19.326 | No decantation | No contamination |

A "classical" sourdough based on the fermentation of rye with lactic acid bacteria stored in the same conditions at room temperature was unstable and became contaminated after 10 days.

Example 7: Sourdoughs Based on Tea Extract and Rye, Rye and Wheat Bran, Rice or Rice and Wheat Bran; Breads Made with Such Sourdoughs

TABLE 5

| sourdoughs composition | | | | |
|---|---|---|---|---|
| sourdough | rye flour | rice flour | wheat bran | Teas extract (example 2) |
| SD4 | 93 g | — | — | 307 g |
| SD5 | 70 g | — | 23 g | 307 g |
| SD6 | — | 93 g | — | 307 g |
| SD7 | — | 70 g | 23 g | 307 g |

All sourdoughs were inoculated with $10^6$ cells of strain MO-620/g sourdough and $10^7$ cells of strain MO-621/g sourdough. They were then fermented at 30° C. during 72 h at 200 rpm in shake flasks placed in an conventional lab-incubator. pH and acidity of the sourdoughs at the end of the fermentation are given in table 6.

TABLE 6

| | pH | Acidity |
|---|---|---|
| SD4 | 4.01 | 17.79 |
| SD5 | 3.93 | 15.48 |
| SD6 | 3.45 | 10.99 |
| SD7 | 3.54 | 18.48 |

Breads were made with the four sourdoughs according to the method of example 4. The flavor of the baked breads was evaluated by an expert panel. All breads presented the same aroma as described for the breads of example 4. The relative intensities of the aromas were ranked as follows: SD5>SD4>SD7>SD6.

Example 8: Sourdough Flavor Composition

Main aromatic components of sourdough 5 were identified by MS (Agilent) after a SPME/GC analysis on a Stabilwax column (RESTEK int.; 30 m; 250 μm ID; 5 μm DF) (fiber DVB/CAR/PDMS from Supelco).

TABLE 7

| identified main aromatic components listed by retention time |
|---|
| Ethyl acetate |
| Ethanol |
| Isoamyl acetate |
| 2-methyl-1-butanol |
| Nonanal |
| Acetic acid |
| Linalole |
| Trans-2-decenal |
| alpha-terpineol |
| Ethyl phenylacetate |
| 2-phenetyl acetate |
| 2-phenylethanol |
| vitispirane |
| gamma-nonalacton |
| hexanal |

Example 9: Stable Liquid Yeast Compositions

Liquid yeast compositions were prepared according to table 8. Final dry matter of the compositions was 22%.

TABLE 8

| | Fresh bakery yeast (DM = 30.36%) | Water | Starter of example 5 |
|---|---|---|---|
| reference | 133 g | 67 ml | — |
| LY1 | 133 g | 27 ml | 40 ml |
| LY2 | 133 g | 13 ml | 54 ml |
| LY3 | 133 g | — | 67 ml |

Liquid yeast compositions were stored for 3 weeks at 10° C. Viscosity at 25° C. of a 25 g sample was measured at 160 rpm after 5 minutes running time with an RVA apparatus (RVA-4 Rapid Visco Analyser Newport Scientific equipped with a double skirted paddle) (table 9).

No decantation of the compositions containing the starter according to the invention was observed.

TABLE 9 viscosities of liquid yeast composition

| Storage time | reference | LY 1 | LY 2 | LY 3 |
|---|---|---|---|---|
| None | 125 mPa.s | 157 mPa.s | 165 mPa.s | 174 mPa.s |
| 1 week | — | 2565 mPA.s | 3107 mPa.s | >10000 mPa.s |
| 2 weeks | — | >10000 mPa.s | >10000 mPa.s | >10000 mPa.s |
| 3 weeks | decantation | No decantation | No decantation | No decantation |

All samples (reference and liquid yeast compositions according to the invention) showed the same yeast activities when measured with a risograph (National Manufacturing TMCO Inc.).

Example 10: Sourdough 307 g of black tea extract of example 2 were mixed with 70 g of rye flour (R1700, Plange Mühle), and 23 g of wheat bran at room temperature. The dough was inoculated with cultures of MO-0000988 (*Brettanomyces anomalus*) and of MO-0001240 (*Acetobacter pasteurianus*) at 3.2 $10^8$ and 2.1 $10^{10}$ cfu/g dough respectively. The liquid dough was incubated at 30° C. during 3 days at 200 rpm in shake flasks placed in a conventional laboratory incubator.

The pH after 3 days was 4.05 and the TTA 22.75 ml.

The sourdough had a pleasant aroma described as being close to "strong red wine".

Example 11: Breads

The liquid sourdough of example 10 was used to prepare pan wheat breads as described in example 4.

The breads were evaluated the day after baking by an expert panel of 8 persons trained to identify and describe aromas and tastes. The main flavor of the bread made with the sourdough was defined by the experts as "close to red wine".

The invention claimed is:

1. A sourdough product comprising cereal or cereal fractions mixed with tea leaves, tea leaves fractions and/or tea leaves extracts, wherein said sourdough product is fermented by strains of acetic acid bacteria and yeast, wherein said one or more strains of acetic acid bacteria are *Gluconoacetobacter hansenii*, or *Gluconoacetobacter rhaeticus*, and wherein said one or more yeast strains are selected from the group consisting of *Zygosaccharomyces, Schizosaccharomyces, Torulopsis, Brettanomyces, Candida,* and *Rhodotorulla*.

2. The sourdough product according to claim 1, wherein said one or more strains of acetic acid bacteria are *Gluconoacetobacter hansenii* MO-621 or *Gluconoacetobacter rhaeticus* MO-622 as deposited on Feb. 25, 2011 in the BCCM/LMG (Laboratorium voor Microbiologie—Bacterienverzameling; Universiteit Gent; K. L. Ledeganckstraat 35; B-9000 Gent, Belgium) under the accession numbers LMG P-26321 and LMG P-26320 respectively and wherein said one or more yeast strains are *Zygosaccharomyces bailii* MO-619 or *Zygosaccharomyces lentus* MO-620 as deposited on Feb. 25, 2011 in the BCCM/MUCL (Mycotheque de l'Universite Catholique de Louvain; Universite Catholique de Louvain; Place Croix du Sud, 3; B-1348 Louvain-la-Neuve, Belgium) under the accession numbers MUCL 53405 and MUCL 53406 respectively or *Brettanomyces anomalus* MO-0000988 as deposited on Jul. 25, 2012 in the BCCM/MUCL under the accession number MUCL 54381.

3. The sourdough product according to claim 1, wherein said sourdough product is fermented by one or more additional microorganisms chosen from lactic acid forming bacteria such as *Leuconostoc* or *Lactobacillus* and/or yeast strains chosen from *Saccharomyces*.

4. The sourdough product according to claim 1, wherein said sourdough product is a liquid sourdough product or a dried sourdough product.

5. The liquid sourdough product according to claim 4, wherein said liquid sourdough product is characterized by having a dry matter between 10% and 45% and a total titratable acidity of at least 10.

6. The liquid or dried sourdough product according to claim 4, wherein said liquid or dried sourdough product is an active or an inactive liquid or dried sourdough product.

7. A dried sourdough product obtained by drying a liquid sourdough product according to claim 4.

8. A method for obtaining a sourdough product comprising the steps of:
mixing cereal or cereal fractions and tea leaves, tea leaves fractions and/or tea leaves extracts with water;
fermenting the mixture with one or more acetic acid bacteria strains and one or more yeast strains at a temperature between 15° C. and 50° C. for period between 24 hours and 1000 hours, thereby obtaining a liquid sourdough product; and;
optionally drying said liquid sourdough product thereby obtaining a dried sourdough product;
wherein said one or more strains of acetic acid bacteria are selected from the group consisting of *Gluconoacetobacter hansenii*, and *Gluconoacetobacter rhaeticus*, and wherein said one or more yeast strains are selected from the group consisting of *Zygosaccharomyces, Schizosaccharomyces, Torulopsis, Brettanomyces, Candida,* and *Rhodotorulla*.

9. A method for obtaining a sourdough product comprising the steps of:
mixing tea leaves, tea leaves fractions and/or tea leaves extracts with water;
pre-fermenting the mixture with one or more acetic acid bacteria strains and one or more yeast strains at a temperature between 15° C. and 50° C. for period between 24 hours and 1000 hours,
adding cereal or cereal fractions using the pre-fermented product obtained from the previous step as a starter for a second fermentation step thereby obtaining a liquid sourdough product; and;
optionally drying said liquid sourdough product thereby obtaining a dried sourdough product;
wherein said one or more strains of acetic acid bacteria are selected from the group consisting of *Gluconoacetobacter hansenii*, and *Gluconoacetobacter rhaeticus*, and wherein said one or more yeast strains are selected from the group consisting of *Zygosaccharomyces, Schizosaccharomyces, Torulopsis,* or *Brettanomyces, Candida* and *Rhodotorulla*.

10. The method according to claim 8, further comprising one or more steps chosen from the group of:
adding other microorganisms and/or additional ingredients to the mixture prior to or after the step of fermenting said mixture;
adding stabilizers after the fermentation step;
inactivating said sourdough; and,
packing said sourdough in containers.

11. A method for preparing food products, wherein a sourdough product according to claim 1 is used as an ingredient.

12. The method according to claim 11, wherein said food product is an improver, a premix or a complete mix used in the preparation of baked products or for stabilizing a liquid baker's yeast suspension.

13. A baked product comprising a sourdough product according to claim 1.

14. The liquid or dried sourdough product according to claim 5, wherein said liquid or dried sourdough product is an active or an inactive liquid or dried sourdough product.

15. The method according to claim 9, further comprising one or more steps chosen from the group of:
   adding other microorganisms and/or additional ingredients to the mixture prior to or after the step of fermenting said mixture;
   adding stabilizers after the fermentation step;
   inactivating said sourdough; and,
   packing said sourdough in containers.

16. The method of claim 11, wherein said food products are baked products.

17. The sourdough product according to claim 1, wherein the sourdough product is characterized as having an apple cider aroma and flavor.

18. The sourdough product according to claim 1, wherein said one or more strains of acetic acid bacteria are *Gluconoacetobacter hansenii* or *Gluconoacetobacter rhaeticus*, and wherein said one or more yeast strains are *Zygosaccharomyces lentus* or *Brettanomyces anomalus*.

19. A method for obtaining a sourdough product comprising the steps of:
   mixing cereal or cereal fractions and tea leaves, tea leaves fractions and/or tea leaves extracts with water;
   fermenting the mixture with acid one or more acetic acid bacteria strains and one or more yeast strains at a temperature between 15° C. and 50° C. for period between 24 hours and 10011 hours, thereby obtaining a liquid sourdough product; and;
   optionally drying said liquid sourdough product thereby obtaining a dried sourdough product
   wherein said one or more strains of acetic acid bacteria are selected from the group consisting of *Gluconoacetobacter hansenii* and *Acetobacter pasteurianus*, and wherein said one or more yeast strains are *Zygosaccharomyces lentus* and *Brettanomyces anomalus*.

20. A method for obtaining a sourdough product comprising the steps of:
   mixing tea leaves, tea leaves fractions and/or tea leaves extracts with water;
   pre-fermenting the mixture with one or more acid acetic acid bacteria strains and one or more yeast strains at a temperature between 15° C. and 50° C. for period between 24 hours and 1000 hours,
   adding cereal or cereal fractions using the pre-fermented product obtained from the previous step as a starter for a second fermentation step thereby obtaining a liquid sourdough product; and
   optionally drying said liquid sourdough product thereby obtaining a dried sourdough product
   wherein said one or more strains of acetic acid bacteria are selected from the group consisting of *Gluconoacetobacter hansenii* and *Acetobacter pasteurianus*, and wherein said one or more yeast strains are selected from the group consisting of *Zygosaccharomyces lentus* and *Brettanomyces anomalus*.

21. The sourdough product according to claim 1, wherein said one or more strains of acetic acid bacteria are selected from the group consisting of *Gluconoacetobacter hansenii* and *Gluconoacetobacter rhaeticus*, and wherein said one or more yeast strains are selected from the group consisting of *Zygosaccharomyces bailii*, *Zygosaccharomyces lentus* and *Brettanomyces anomalus*.

22. The method according to claim 8, wherein said one or more strains of acetic acid bacteria are selected from the group consisting of *Gluconoacetobacter hansenii* and *Gluconoacetobacter rhaeticus*, and wherein said one or more yeast strains are selected from the group consisting of *Zygosaccharomyces bailii*, *Zygosaccharomyces lentus* and *Brettanomyces anomalus*.

23. The method according to claim 9, wherein said one or more strains of acetic acid bacteria are *Gluconoacetobacter hansenii* or *Gluconoacetobacter rhaeticus*, and wherein said one or more yeast strains are selected from the group consisting of *Zygosaccharomyces bailii*, *Zygosaccharomyces lentus* and *Brettanomyces anomalus*.

* * * * *

UNITED STATES PATENT AND TRADEMARK OFFICE
CERTIFICATE OF CORRECTION

PATENT NO. : 10,085,457 B2
APPLICATION NO. : 14/238109
DATED : October 2, 2018
INVENTOR(S) : Paul De Pauw Page 1 of 1

It is certified that error appears in the above-identified patent and that said Letters Patent is hereby corrected as shown below:

In the Claims

Column 17, Line 38, Claim 19, delete "24 hours and 10011 hours" and insert --24 hours and 1000 hours--.

Signed and Sealed this
Nineteenth Day of March, 2019

Andrei Iancu
*Director of the United States Patent and Trademark Office*